Aug. 7, 1962     B. C. ALM, JR     3,048,712

PULSE TIME DISCRIMINATOR APPARATUS

Filed Jan. 28, 1959

INVENTOR
Benjamin C. Alm, Jr.
BY
ATTORNEY

United States Patent Office 3,048,712
Patented Aug. 7, 1962

3,048,712
PULSE TIME DISCRIMINATOR APPARATUS
Benjamin C. Alm, Jr., Severna Park, Md., assignor to Westinghouse Electric Corporation, East Pittsburgh, Pa., a corporation of Pennsylvania
Filed Jan. 28, 1959, Ser. No. 789,692
7 Claims. (Cl. 307—88.5)

This invention relates to improvements in pulse time discriminators, and more particularly to an improved pulse time discriminator employing a hyperconductive diode or diodes.

A pulse time discriminator circuit finds wide use in the electronic arts, for example, in radar tracking circuits. Prior art pulse time discriminators, however, have a number of disadvantages, including requiring the incoming pulses desired to be discriminated to pass through a resistive network, thus substantially attenuating the pulses.

The apparatus of the instant invention employs a pair of hyperconductive diodes and utilizes their hyperconductive charcteristics. For a more detailed understanding of the operation of a hyperconductive diode, reference may be had to a copending application by John Philips for Semiconductor Diode, Serial No. 642,743, filed February 27, 1957, now Patent No. 2,953,693, and assigned to the assignee of the instant application.

Accordingly, a primary object of the invention is to provide a new and improved pulse time discriminator.

Another object is to provide a new and improved pulse time discriminator employing hyperconductive diodes.

Broadly, the present invention provides pulse time discrimination apparatus wherein, incoming video pulses of positive and negative polarities are selectively applied, according to their polarity, to an output circuit through hyperconductive diodes, which are selectively triggered into conduction.

Other objects and advantages will become apparent after a study of the following specification, when read in connection with the accompanying drawing, in which.

Figure 1:
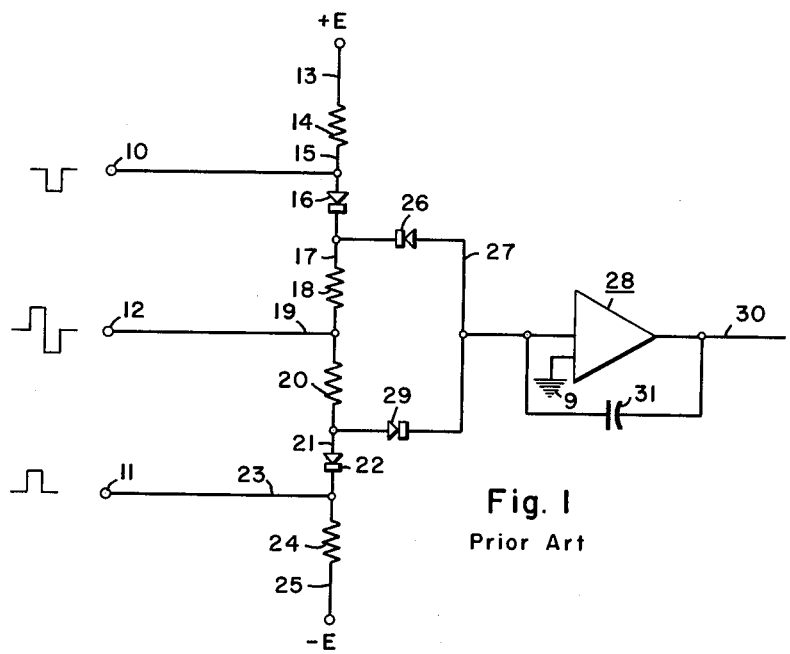
FIGURE 1 is a view of a widely used pulse time discriminator according to the prior art, and is included to facilitate an understanding of the invention.

Particular reference should be made now to FIG. 1, in which there are shown a pair of terminals 10 and 11 to which tracking gates are applied, and a video input terminal 12. A voltage dividing network is provided including, in series, lead 13 which is connected to the positive terminal of a suitable source of direct current potential, not shown, resistor 14, lead 15, rectifier 16, lead 17, resistor 18, lead 19, resistor 20, lead 21, rectifier 22, lead 23, and resistor 24 which is connected by way of lead 25 to the negative terminal of the aforementioned source of direct current potential, not shown. It should be noted that rectifier 16 and rectifier 22 are both of such a polarity that current flows through the entire network from the source of potential. Lead 15 is connected to the aforementioned tracking gate input terminal 10, lead 19 is connected to the aforementioned video input terminal 12, and lead 23 is connected to the aforementioned tracking gate terminal 11. Lead 17 is connected by way of rectifier 26 and lead 27 to the input of an amplifier 28, whereas the aforementioned lead 21 is connected by way of an additional rectifier 29 poled oppositely from the aforementioned rectifier 26 to the lead 27. The output of the amplifier 28 is delivered to lead 30, and capacitor 31 may be connected across the amplifier 28. Amplifier 28 also has a connection to ground 9.

In the operation of the apparatus of FIG. 1, while no tracking gates are present at either of the terminals 10 or 11, current flows through the aforementioned network from the positive terminal to the negative terminal of the source of potential, not shown. Diodes or rectifiers 16 and 22 are normally conducting. The current in the network causes voltage drops across resistors 18 and 20, which voltage drops bias diodes 26 and 29 in reverse directions, and isolate the discriminator output lead 27 and amplifier 28 from the video input at input terminal 12. The component values in the network are chosen, or the network is constructed and arranged, so that terminal 12 is at virtual ground potential. Under these conditions, any video pulses appearing at 12 are shunted through diodes 16 or 22, and prevented from reaching the discriminator output lead 27, which is the input to the aforementioned amplifier 28, because of the back biases across the diodes 26 and 29. However, if simultaneously occurring positive and negative tracking gates are applied at terminals 11 and 10, respectively, diodes 16 and 22 will be back-biased and current will no longer flow through resistors 18 and 20. During this interval, diodes 26 and 29 are no longer back-biased and video pulses present at the terminal 12 will cause current to flow in the lead means 27, the capacitor 31 and the amplifier output lead means 30. A positive video pulse causes a current to flow through resistor 20 and diode 29 to the lead means 27, and a negative video pulse at 12 causes current to flow to the discriminator output lead 27 through diode 26 and resistor 18. The net current in the discriminator output lead means 27 is then a measure of the relative time displacement between the tracking gates and the center of the bi-polarized video pulse at terminal 12. It should be noted that the maximum output current for a given video pulse width and amplitude is inversely proportional to the resistance of resistors 18 or 20 and the forward resistance of the diode 26, or that of the diode 29, assuming a low impedance source for the video pulses at terminal 12.

Figure 2:
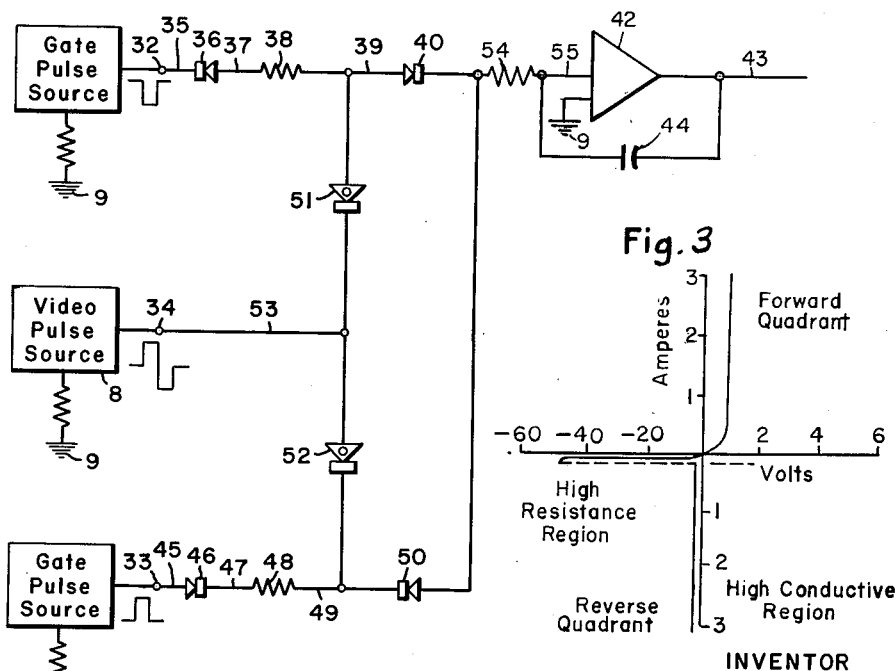
FIG. 2 is a schematic electrical circuit diagram of the invention according to the preferred embodiment thereof.

Particular reference should be made now to FIG. 2, which is a schematic electrical circuit diagram of the invention according to the preferred embodiment thereof. In FIG. 2, terminals 32 and 33 have gating pulses applied thereto, whereas terminal 34 has the video signal or bi-polarized pulse applied thereto. Gating pulse input terminal 32 is connected by way of lead 35, rectifier 36, lead 37, resistor 38, lead 39, rectifier or diode 40, lead 41, resistor 54 and discriminator output lead 55 to the input of an amplifier 42 having an output lead 43. The amplifier 42 may have a low input impedance, which may be negligible and which is neglected in the following description of the operation of the apparatus to simplify the explanation thereof. The capacitor 44 may be connected across the amplifier 42 as shown. Amplifier 42 is also connected to ground 9.

The other gating pulse input terminal 33 is connected by way of lead 45, rectifier 46, lead 47, resistor 48, lead 49, and diode 50 to aforementioned lead 41. Connected between the aforementioned leads 39 and 49 are a pair of series-connected hyperconductive diodes, the hyperconductive diodes 51 and 52 being interconnected by lead 53 which is connected to the aforementioned video input terminal 34. It should be noted that hyperconductive diodes 51 and 52 are poled in the same direction.

Figure 3:
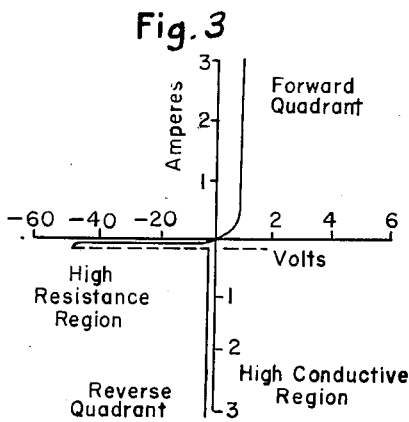
FIG. 3 is a graph of the voltage-current characteristic of a hyperconductive semiconductor diode employed in the invention.

In FIGURE 3 there is shown the voltage-current characteristic curve of a suitable hyperconductive diode for use in the instant invention, the characteristic curve of FIGURE 3 being similar to that shown in the aforementioned copending application Serial No. 642,743. Considering the forward or first quadrant, when a forward voltage of the order of one voltage unit is applied the current builds up to approximately 3 current units. When the polarity of the voltage is reversed on the hyperconductive diode, the voltage builds up in the reverse direction to approximately 55 voltage units with only a small fraction of 1 current unit of current flowing; then the diode suddenly becomes hyperconductive in the reverse direction and the voltage drops to approximately 1 voltage unit, as shown in the reverse or third quadrant. Thus, the diode becomes highly conductive with low ohmic resistance, and the current builds up rapidly to several amperes or current units. As shown by the portion of the curve of FIGURE 3 in the reverse quadrant, when the hyperconductive diodes breaks down the voltage drops along a substantially straight line to approximately one voltage unit, and very little power is dissipated in maintaining the hyperconductive diode highly conductve in a reverse direction. The hyperconductive diode can be rendered hghly resistant again by reducing the current flow below a minimum threshold value, or momentarily reducing the voltage thereacross to zero. Consequently, the curve can be repeatedly followed as desired by properly controlling the magnitude of the reverse current and voltage.

In the operation of the apparatus of FIG. 2, assume by way of description that the sources for the tracking gates and for the bi-polarized video pulse are low impedance sources. As aforementioned, 51 and 52 are hyperconductive diodes, and the rectifiers 36, 40, 46 and 50 are conventional diodes. The amplitude of the tracking gate at terminal 32 is such that the voltage applied across resistor 38 and hyperconductive diode 51, and the amplitude of the tracking gate at terminal 33 is such that the voltage applied across resistor 48 and hyperconductive diode 52, will cause sufficient current to flow to trigger the hyperconductive diodes 51 and 52 into their hyperconductive regions, this current flow taking place through the internal impedance of video source 8. When this occurs, the resistance of the hyperconductive diodes drops to a very low value, and video pulses at terminal 34 will cause current to flow in the discriminator output lead 55 and supply and input to amplifier 42, due to the fact that the resistances of the hyperconductive diodes 51 and 52 are now considerably smaller than the resistance values of resistors 38 and 48. Positive video pulses will cause current to flow through hyperconductive diode 51, diode 40, lead 41, and resistor 54 to lead 55. Negative video pulses at terminal 34 will cause current to flow to the lead 55 through hyperconductive diode 52, diode 50, lead 41, and resistor 54 to lead 55. When the gates are not present at terminals 32 and 33, video pulses will not appreciably affect the discriminator output lead means 55 because of the attenuation in the voltage dividers, that is, the untriggered back resistance of dynistor 51 and the resistance of resistor 38 (and also the untriggered back resistance of hyperconductive diode 52 and the resistance of resistor 48). It should be noted that during the interval when the hyperconductive diodes are triggered, the resistance seen by a video pulse at terminal 34, a positive pulse for example, consists of the hyperconductive resistance of hyperconductive diode 51 in series with the forward resistance of diode 40 and resistance 54. Assuming both circuits of FIGS. 1 and 2 are constructed to give optimum performance, the total resistance including the hyperconductive resistance of the hyperconductive diode in series with resistance 54 will be considerably less than the required resistance of resistors 18 or 20 in FIG. 1, so that appreciably higher output currents will be obtained from a video pulse of a given width and amplitude. Diodes 36 and 46 in FIG. 2 do not affect the basic operation of the circuit but are present to prevent forward current flow through the hyperconductive diodes which might hamper their blocking characteristics. The value of resistor 54 must be such that the current caused to flow through the hyperconductive diode 51 and diode 40 by the positive video pulse (and the current through hyperconductive diode 52 and diode 50 by the negative video pulse) is limited to a value below the switching current of the hyperconductive diode.

The output of the pulse time discriminator on lead 55 is particularly suitable to supply an input to a high gain integrating amplifier, and the amplifier 42 may be of this type if desired.

There has been provided, then, apparatus well suited to accomplish the aforedescribed objects of the invention, which include the provision of higher output currents for video input pulses of a given width and amplitude. The apparatus of the instant invention has the further advantage that no external source of potential is required.

Since the hyperconductive diodes may be expected to have a recovery or turn-off time up to one microsecond, the input pulse repetition rate should be selected to allow recovery.

If desired, a resistor of suitable value, not shown, may be connected from lead 53 to ground 9.

While the invention has been shown and described with reference to the preferred embodiment thereof which gives satisfactory results, it should be understood that changes may be made and equivalents substituted without departing from the spirit and scope of the invention.

I claim as my invention:

1. In pulse time discriminator apparatus, in combination, output circuit means, first and second hyperconductive diodes, a source of positive and negative video pulses, operatively connected to said first and second hyperconductive diodes, circuit means operatively connected to said first hyperconductive diode for triggering said first hyperconductive diode into its hyperconductive region while a negative gating pulse is applied to the first hyperconductive diode whereby a positive video pulse applied coincident with said negative gating pulse is passed through the first hyperconductive diode to said output circuit means, and other circuit means operatively connected to said second hyperconductive diode whereby a positive gating pulse triggers said second hyperconductive diode into its hyperconductive region and a negative video pulse coincident with said positive gating pulse is passed through the second hyperconductive diode to said output circuit means.

2. In pulse time discriminator apparatus in combination, first and second hyperconductive diodes, first input means adapted to have a negative gating pulse applied thereto, second input means adapted to have a positive gating pulse applied thereto, third input means adapted to have video pulses of positive and negative polarity applied thereto, output circuit means, circuit means connecting said first and third input means and said first hyperconductive diode to said output circuit means whereby positive video pulses substantially coincident with negative gating pulses are passed through said first hyperconductive diode to said output circuit means, and other circuit means connecting said second and third input means and said second hyperconductive diode to said output circuit means whereby negative video pulses substantially coincident with positive gating pulses are passed through said second hyperconductive diode to said output circuit means.

3. In pulse time discriminator apparatus, in combination, a first hyperconductive diode, first gate pulse means operatively connected to said first hyperconductive diode for causing said first hyperconductive diode to operate in its hyperconductive region while a gate pulse of a first predetermined polarity is applied thereto, a second hyperconductive diode, second gate pulse means operatively connected to said second hyperconductive diode for causing said second hyperconductive diode to operate in its hyperconductive region while a gate pulse of the other polarity is applied thereto, both said first and second hyperconductive diodes being adapted to have video pulses applied thereto, output circuit means, circuit means including rectifier means connecting said first hyperconductive diode to said output circuit means whereby positive video pulses occurring while the first hyperconductive diode is operating in its hyperconductive region are passed through the first hyperconductive diode to said output circuit means, and other circuit means including other rectifier means operatively connecting said second hyperconductive diode to said output circuit means whereby negative video pulses occurring while the second hyperconductive diode is operating in its hyperconductive region are passed through the second hyperconductive diode to said output circuit means.

4. In pulse time discriminator apparatus, in combination, output circuit means, video input circuit means adapted to have a source of positive and negative video pulses connected thereto having a low internal impedance with respect to ground, first hyperconductive diode means, first rectifier means, circuit means connecting said first hyperconductive diode means and first rectifier means in series between said input circuit means and said output circuit means, said first hyperconductive diode means being connected so that positive video pulses are applied thereto in a reverse direction, said first rectifier means being of a polarity so that positive video pulses are applied thereto in a forward direction, second hyperconductive diode means, second rectifier means, other circuit means connecting said second hyperconductive diode means and second rectifier means in series between said input circuit means and output circuit means, said second hyperconductive diode means being connected so that negative video pulses are applied thereto in a reverse direction, said second rectifier means being of a polarity so that negative video pulses are applied thereto in a forward direction, gate pulse means operatively connected to said first hyperconductive diode means whereby gating pulses of a negative polarity cause a sufficient current flow through said first hyperconductive diode means to trigger said first hyperconductive diode means into its hyperconductive region, and other gate pulse means operatively connected to said second hyperconductive diode means for applying a positive gating pulse to said second hyperconductive diode means and causing sufficient current to flow through said second hyperconductive diode means to trigger said second hyperconductive diode means into its hyperconductive region, video pulses of predetermined polarity occurring while said first and second hyperconductive diode means are triggered into their hyperconductive regions causing substantial video signal currents to flow in said output circuit means.

5. In pulse time discriminator apparatus, in combination, a first hyperconductive diode, a second hyperconductive diode, each of the first and second diodes being normally non-hyperconductive and adapted to become hyperconductive when a potential of predetermined amplitude is applied thereacross in a reverse direction, first gate pulse generator means for producing a first gating pulse of a first predetermined polarity and at least a predetermined amplitude, second gate pulse generator means for producing a second gating pulse of at least a predetermined amplitude and of the opposite polarity, a source of signal pulses having a predetermined internal resistive impedance for generating signal pulses of both polarities, first circuit means including first resistor means and said first hyperconductive diode interconnecting the first gate pulse generator means and the source of signal pulses, the first resistor means having a resistance value which is small compared to the backward resistance of the first hyperconductive diode while not in a hyperconductive state and having a resistance value which is large compared to the resistance of the first hyperconductive diode while in a hyperconductive state, second circuit means including second resistor means and said second hyperconductive diode interconnecting the second gate pulse generator means and the source of signal pulses, the second resistor means having a resistance value which is small compared to the backward resistance of the second hyperconductive diode while not in a hyperconductive state and having a resistance value which is large compared to the resistance of the second hyperconductive diode while in a hyperconductive state, a gating pulse of said first predetermined polarity from the first gate pulse generator means passing through the first hyperconductive diode in a reverse direction and causing said last named diode to become hyperconductive thereby causing the resistance of the last named hyperconductive diode to fall to a low value, output circuit means, first rectifier means of predetermined polarity connecting the output circuit means to the first circuit means at the junction between the first hyperconductive diode and the first resistor means, gating pulses from the second gate pulse generator means causing the second hyperconductive diode to become hyperconductive, and second rectifier means of predetermined polarity connecting the output circuit means to the second circuit means at the junction between the second hyperconductive diode and the second resistor means, signal pulses of predetermined polarity while the first hyperconductive diode is in a hyperconductive state passing through the first hyperconductive diode and the first rectifier means to the output circuit means, signal pulses of the opposite polarity while the second hyperconductive diode is in a hyperconductive state passing through the second hyperconductive diode and the second rectifier means to the output circuit means, signal pulses of both polarities while the hyperconductive diodes are not in hyperconductive states being reduced in amplitude at the first and second rectifier means as a result of the high resistance of the hyperconductive diodes whereby said last named signal pulses produce signals of substantially zero amplitude in the output circuit means.

6. Pulse time discriminator apparatus according to claim 5 including in addition third and fourth rectifier means poled in predetermined directions and operatively connected at the first and second gate pulse generator means respectively in series in the first and second circuit means respectively for preventing forward current flows in the first and second hyperconductive diodes respectively as a result of signal pulses of predetermined polarities applied to said first and second hyperconductive diodes.

7. Pulse time discriminator apparatus comprising, in combination, a source of signal pulses of alternating polarities, output circuit means, circuit means forming a first signal channel for signal pulses of one polarity including a first hyperconductive diode connecting the signal pulse source to the output circuit means, other circuit means forming a second signal channel for signal pulses of the opposite polarity including a second hyperconductive diode connecting the signal pulse source to the output circuit means, each of the first and second diodes being normally non-hyperconductive and adapted to become hyperconductive when a potential of predetermined amplitude is applied thereacross in a reverse direction, and first and second gate pulse generators for generating first and second gating pulses of first and second opposite polarity operatively connected to the first and second hyperconductive diodes respectively, the gate pulses of first and second polarities while applied to the first and second hyperconductive diodes respectively causing the diodes to become hyperconductive and causing their respective resistances to fall to low values, signal pulses occurring simultaneously with the gating pulses and while the hyperconductive diodes are in hyperconductive states being passed through the first and second signal channels to the output circuit means.

References Cited in the file of this patent

UNITED STATES PATENTS

| | | |
|---|---|---|
| 2,807,015 | Shank | Sept. 17, 1957 |
| 2,812,437 | Lyon | Nov. 5, 1957 |
| 2,827,611 | Beck | Mar. 18, 1958 |
| 2,855,513 | Hamburgen et al. | Oct. 7, 1958 |
| 2,949,544 | Hill | Aug. 16, 1960 |
| 2,962,607 | Bright | Nov. 29, 1960 |